US012753807B2

(12) United States Patent
Murakami

(10) Patent No.: US 12,753,807 B2
(45) Date of Patent: Oct. 6, 2026

(54) CAM CLUTCH

(71) Applicant: TSUBAKIMOTO CHAIN CO., Osaka (JP)

(72) Inventor: Tadashi Murakami, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/282,062

(22) Filed: Jul. 28, 2025

(65) Prior Publication Data

US 2026/0036177 A1 Feb. 5, 2026

(30) Foreign Application Priority Data

Aug. 1, 2024 (JP) ................................ 2024-126033

(51) Int. Cl.
*F16D 41/07* (2006.01)

(52) U.S. Cl.
CPC .................................. *F16D 41/07* (2013.01)

(58) Field of Classification Search
CPC ......................... F16D 2041/0643; F16D 41/07
See application file for complete search history.

(56) References Cited

U.S. PATENT DOCUMENTS 11,808,312 B2 * 11/2023 Heubach ................. F16D 41/28
2016/0195146 A1 * 7/2016 Ishitani ................... F16D 41/07 192/72
2022/0056963 A1 2/2022 Nakagawa et al.
2023/0341011 A1 * 10/2023 Brzus .................... F16C 41/001

FOREIGN PATENT DOCUMENTS

CN 114001105 A * 2/2022 ........... F16D 41/064
DE 102019133857 A1 * 6/2021 ............. F16D 41/07
JP 2020-190255 A 11/2020

* cited by examiner

*Primary Examiner* — Lori Wu
(74) *Attorney, Agent, or Firm* — WHDA, LLP

(57) ABSTRACT

Provided is a cam clutch that has a simple structure, ensures good engagement and stable torque transmission, offers a high degree of design flexibility, and enables reduced manufacturing costs. The cam clutch includes a plurality of cams 130 arranged between an inner ring and an outer ring provided coaxially and rotatably relative to each other, at least one auxiliary member 150 arranged between the plurality of cams 130, and biasing means 160 configured to bias the plurality of cams 130 and the auxiliary member 150 in a radial direction, and the auxiliary member 150 has an engaging portion that is engageable with the biasing means 160 and has a radial dimension that is equal to or less than the dimension between the inner ring and the outer ring.

6 Claims, 16 Drawing Sheets

CAM CLUTCH

BACKGROUND OF THE INVENTION

1. Field of the Invention

The present invention relates to a cam clutch including a plurality of cams arranged between an inner ring and an outer ring that are provided coaxially and rotatably relative to each other, at least one auxiliary member arranged between the plurality of cams, and biasing means configured to bias the plurality of cams in a radial direction.

2. Description of the Related Art

Conventionally, a cam clutch is known that includes a plurality of cams arranged between an inner ring and an outer ring that are provided coaxially and rotatably relative to each other, and biasing means configured to bias the plurality of cams in a radial direction (see, for example, Japanese Patent Application Publication No. 2020-190255).

A cam clutch 100 disclosed in Japanese Patent Application Publication No. 2020-190255, for example (the names and reference numerals of the components in this paragraph follow those used in Japanese Patent Application Publication No. 2020-190255), is configured such that an inner ring 110 is arranged radially inside an outer ring 120, a plurality of cams 131 are arranged between the outer ring 120 and the inner ring 110, the plurality of cams 131 are biased radially inward by biasing means 139, and when the outer ring 120 and the inner ring 110 rotate relative to each other, the height of the cams 131 in the radial direction changes, thereby enabling torque to be transmitted between the outer ring 120 and the inner ring 110.

SUMMARY OF THE INVENTION

The cam clutch 100 disclosed in Japanese Patent Application Publication No. 2020-190255 (the names and reference numerals of the components in this paragraph follow those used in Japanese Patent Application Publication No. 2020-190255) is configured such that the cams 131 are arranged with no gaps in the circumferential direction in order to ensure a high torque transmission capacity.

Since the cams 131 are arranged with no gaps, the number of cams 131 is determined by the diameter of the outer circumferential surface of the inner ring 110 and the size of the cams 131, which reduces the degree of design flexibility and may result in excessive performance when the required transmission torque capacity is low.

When the cams 131 operate, adjacent cams 131 may rotate in opposite directions and slide against each other, which may inhibit the operation of the cams 131, reduce the engagement with the outer ring 120 and the inner ring 110, destabilizes the transmitted torque, and result in wear of the cams 131.

Also, when a cam cage ring 648 made of a metal wire material bent to form a storage portion 649 for the cam 131 is provided in order to maintain the posture of the cam 131, it becomes necessary to manufacture cam cage rings 648 corresponding to the number of cams 131, which complicates the structure and may increase manufacturing costs.

The present invention is directed to solving these problems, and an object of the invention is to provide a cam clutch that has a simple structure, ensures good engagement and stable torque transmission, offers a high degree of design flexibility, and enables reduced manufacturing costs.

The above-described problems are solved by a cam clutch according to the present invention that includes a plurality of cams arranged between an inner ring and an outer ring provided coaxially and rotatably relative to each other, at least one auxiliary member arranged between the plurality of cams, and biasing means configured to bias the plurality of cams in a radial direction, and the auxiliary member has an engaging portion that is engageable with the biasing means and has a radial dimension that is equal to or less than a dimension between the inner ring and the outer ring.

The cam clutch according to one aspect of the present application includes a plurality of cams arranged between an inner ring and an outer ring provided coaxially and rotatably relative to each other, at least one auxiliary member arranged between the plurality of cams, and biasing means configured to bias the plurality of cams in a radial direction, and the auxiliary member has an engaging portion that is engageable with the biasing means and has a radial dimension that is equal to or less than a dimension between the inner ring and the outer ring. As a result, it is possible to reduce the sliding resistance of the cams, improve engagement, and stabilize transmitted torque, without hindering free rotation of the inner and outer rings.

Furthermore, the number of cams and rollers to be arranged can be reduced to the minimum necessary to meet the required performance.

According to another aspect of the present application, at least one of the auxiliary members has a cylindrical portion that can come into contact with an adjacent one of the cams, so that when the cam operates, the auxiliary member itself rolls in accordance with the oscillation of the cam, thereby further improving engagement.

According to another aspect of the present application, at least one of the auxiliary members has a circumferential dimension that is equal to or greater than that of the cam, so that the number of cams to be arranged can be optimized regardless of the diameter of the outer circumferential surface of the inner ring and the size of the cam, and the degree of design flexibility can be improved.

According to another aspect of the present application, at least one of the auxiliary members has a depending portion at each circumferential end thereof, the depending portion is formed to extend toward the inner ring and has a lower end that comes into contact with an outer circumferential surface of the inner ring as seen in an axial direction, thereby enabling a reduction in the contact area between the auxiliary member and the outer circumferential surface of the inner ring and a reduction in sliding resistance between the auxiliary member and the outer circumferential surface of the inner ring when the auxiliary member has an increased size.

According to another aspect of the present application, at least one of the auxiliary members includes a holding recess formed at a circumferential end thereof to rotatably hold the cam, thereby preventing radial movement of the auxiliary member and reducing sliding resistance between the auxiliary member and the outer ring or the inner ring.

According to another aspect of the present application, the outer ring and the inner ring each have a flange portion that restricts axial movement of the cam and the auxiliary member, and the engaging portion is formed at one axial end, so that when the biasing means is arranged at one axial end, the auxiliary member can be provided.

DESCRIPTION OF THE PREFERRED EMBODIMENTS

Now, a cam clutch 100 according to a first embodiment of the present invention will be described with reference to the accompanying drawings.

In FIGS. 1 to 3 and 7, the inner ring and the outer ring are not shown.

Figure 7:
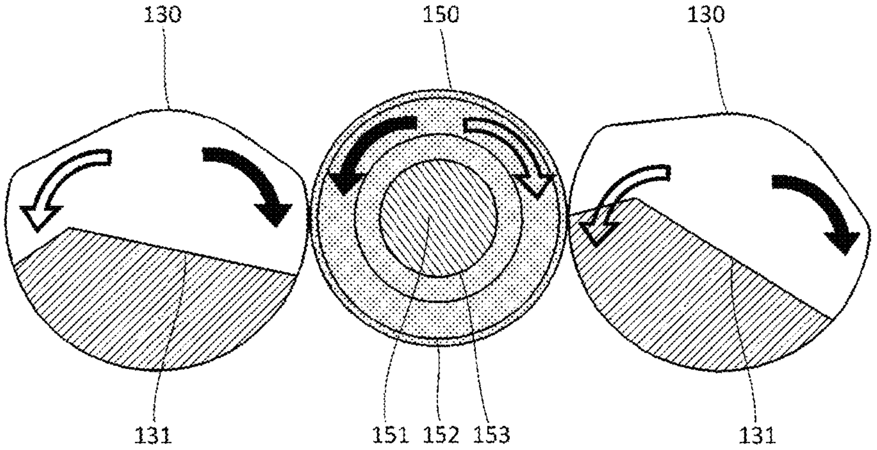
FIG. 7 is a cross-sectional view of the cams and the auxiliary member taken along line A-A in FIG. 3 illustrating the operation of these components.

FIG. 7 illustrates only the auxiliary member 150 and the cam 130 adjacent thereto.

Figure 1:
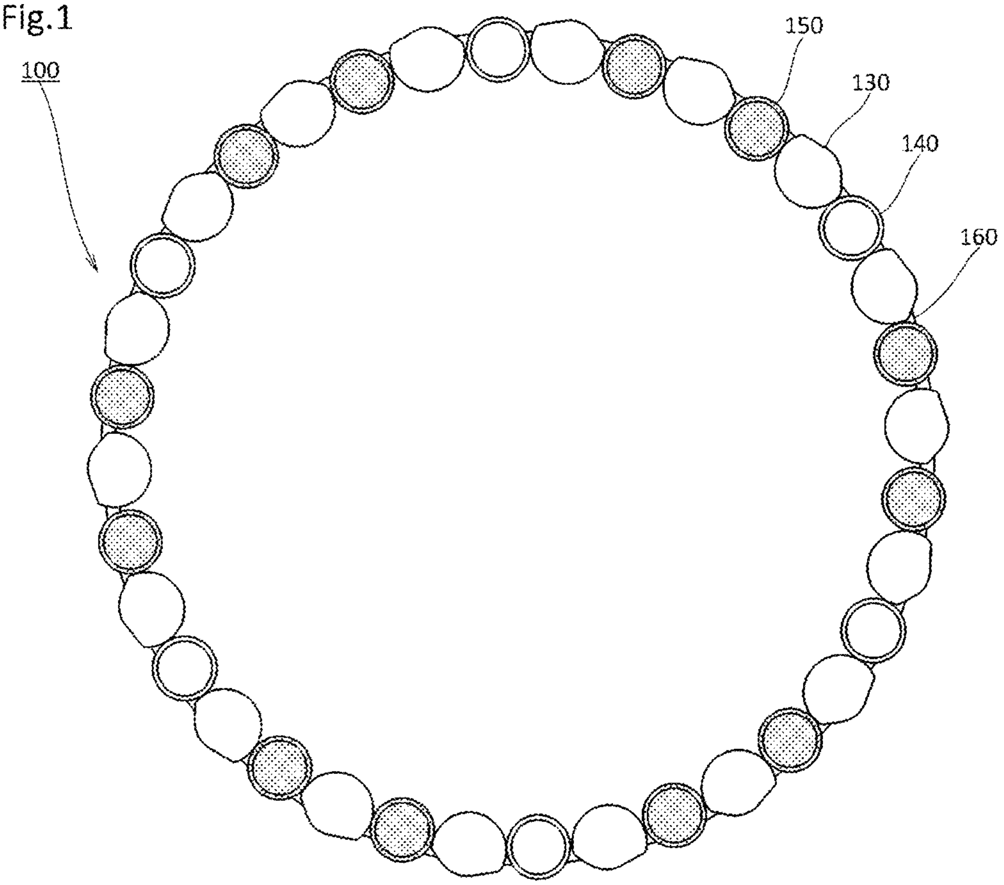
FIG. 1 is a front view of a cam clutch according to a first embodiment of the present invention as seen in the axial direction.
Figure 2:
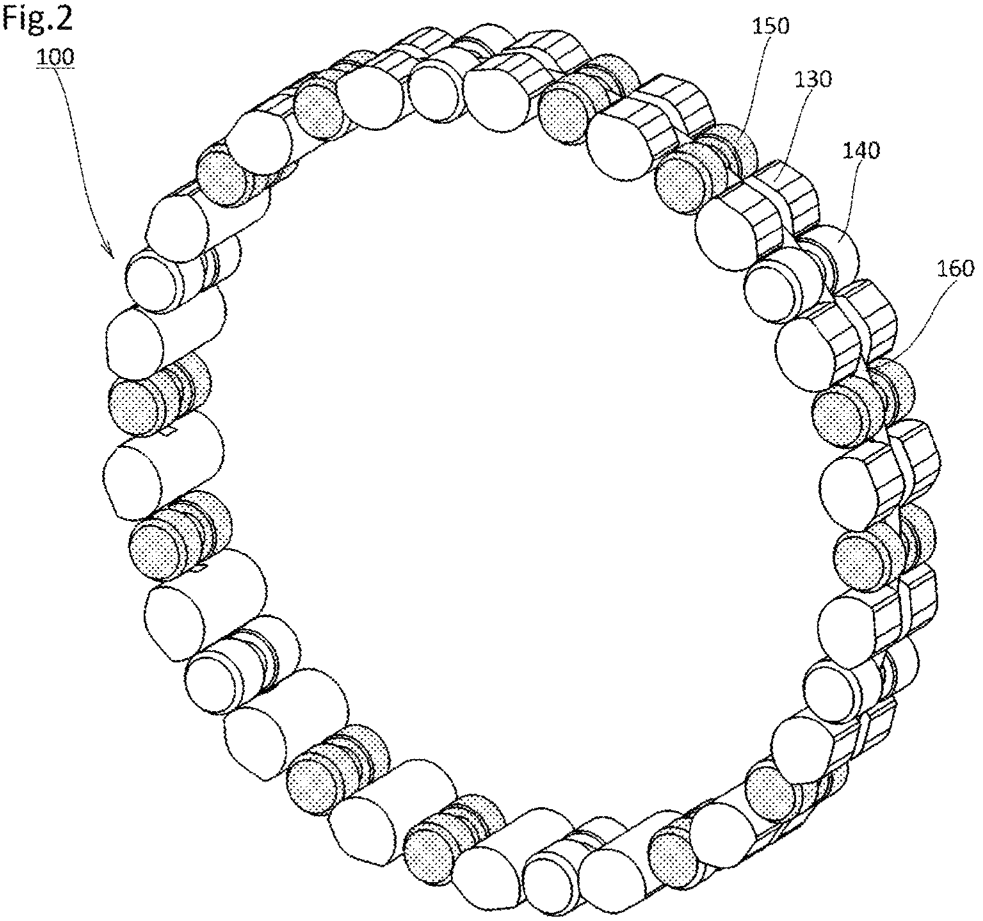
FIG. 2 is a perspective view of the cam clutch of FIG. 1 as seen from above.
Figure 3:
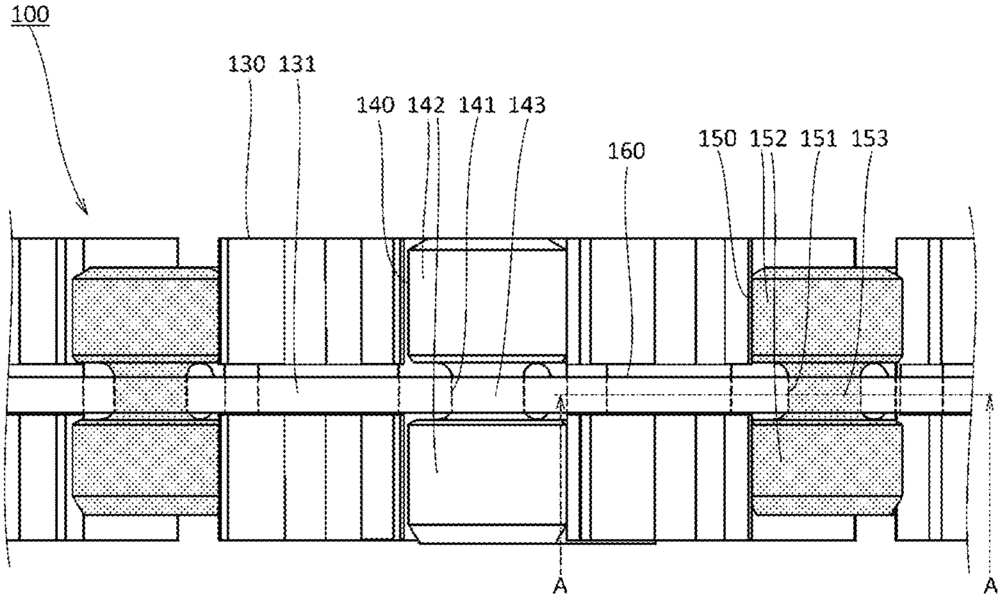
FIG. 3 is an enlarged top view of the cam clutch of FIG. 1.

As shown in FIGS. 1 to 3, the cam clutch 100 according to the first embodiment of the present invention includes a plurality of cams 130, which serve as engaging members configured to transmit and interrupt torque between an inner ring and an outer ring provided rotatably relative to each other on a common central axis in an annular space defined between a raceway surface of the inner ring and a raceway surface of the outer ring, a plurality of rollers 140 arranged between the cams 130 to allow free rotation of the inner ring and the outer ring, a plurality of auxiliary members 150 arranged between the cams 130, and an annular spring 160 that serve as biasing means.

The annular spring 160 radially biases the plurality of cams 130 and oscillates them in the direction of engagement with the inner ring and the outer ring.

Figure 4:
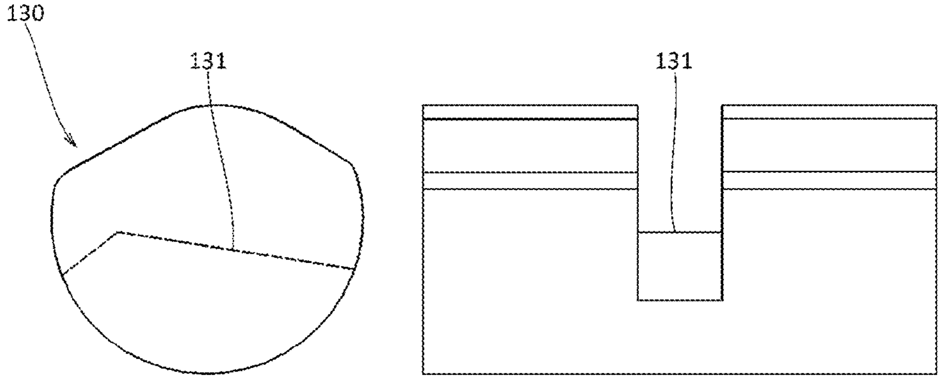
FIG. 4 includes a front view and a side view of the cam of the cam clutch of FIG. 1.

As shown in FIG. 4, the cam 130 has, at an axial center, an engaging stepped portion 131 that is engageable with the annular spring 160.

The engaging stepped portion 131 has an inclined shape that forms a protrusion at an eccentric position, and the cam 130 is biased radially toward the inner ring, as the spring 160 presses against the protrusion at the bottom of the engaging stepped portion 131, thereby causing the cam 130 to oscillate in a direction in which the cam 130 comes into contact with both the inner ring and the outer ring.

Figure 5:
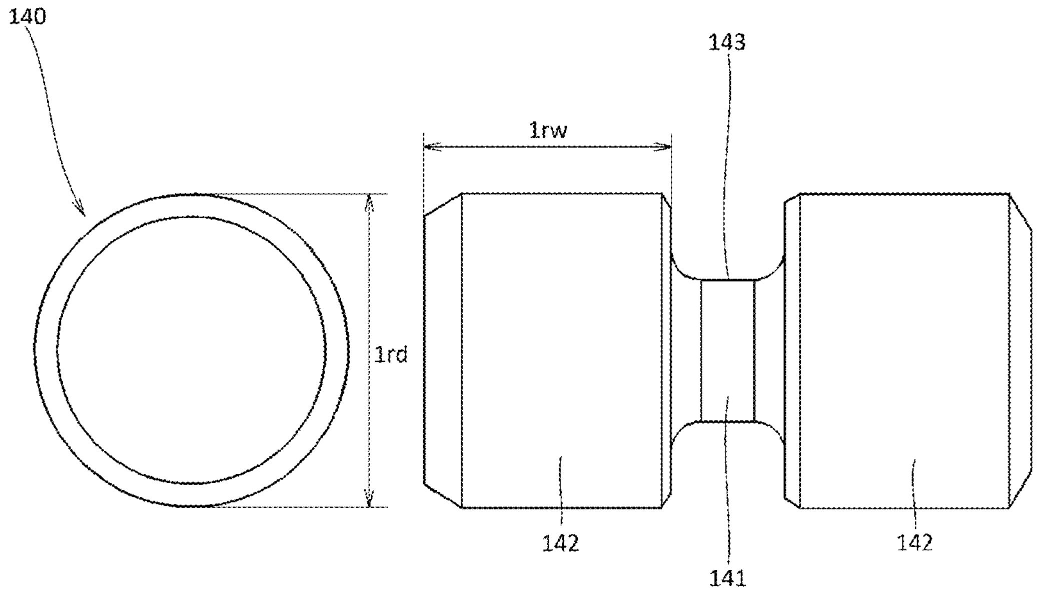
FIG. 5 includes a front view and a side view of a roller of the cam clutch of FIG. 1.

As shown in FIG. 5, the roller 140 is configured to have a dumbbell shape, and includes a shaft portion 141 extending in the axial direction, a pair of cylindrical portions 142 continuous to both ends of the shaft portion 141, and an engaging portion 143 which is engageable with the annular spring 160 at the axial center.

The engaging portion 143 is formed by a space defined between the pair of cylindrical portions 142, and a spring 160 is arranged between the pair of cylindrical portions 142.

Figure 6:
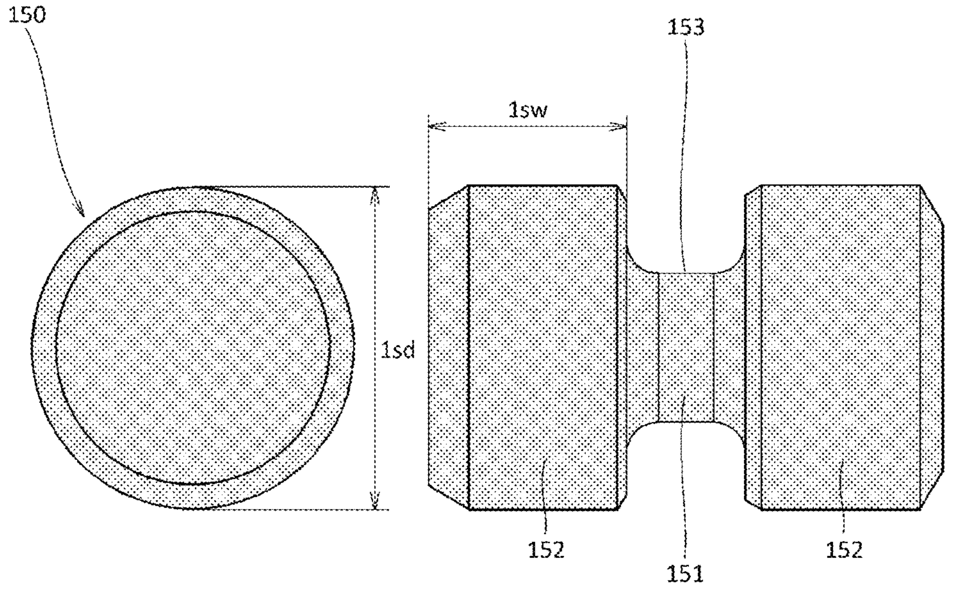
FIG. 6 includes a front view and a side view of an auxiliary member of the cam clutch of FIG. 1.

As shown in FIG. 6, the auxiliary member 150 is configured to have a dumbbell shape and includes a shaft portion 151 extending in the axial direction, a pair of cylindrical portions 152 respectively continuous with each end of the shaft portion 151, and an engaging portion 153 located at the center in the axial direction and engageable with the annular spring 160.

The pair of cylindrical portions 152 can be in contact with the cam 130 adjacent to the auxiliary member 150 and have an axial dimension 1*sw* which is equal to or less than the axial dimension 1*rw* of the cylindrical portion 142 of the roller 140, and the cylindrical portions 152 has a diameter 1*sd* which is equal to or less than the radial dimension between the inner ring and the outer ring and is also equal to or less than the diameter 1*rd* of the cylindrical portion 142 of the roller 140.

As a result, the auxiliary member 150 can rotate in response to oscillation of the cam 130 adjacent to the auxiliary member 150, without hindering free rotation of the inner ring and the outer ring.

The engaging portion 153 is formed by a space defined between the pair of cylindrical portions 152 and is configured such that the spring 160 is arranged in the space between the pair of cylindrical portions 152.

The spring 160 may be a garter spring and is looped around the engaging stepped portion 131 of the cam 130, the engaging portion 143 of the roller 140, and the engaging portion 153 of the auxiliary member 150, so as to bias the cam 130 in the radial direction and cause it to oscillate in the engagement direction with the inner ring and the outer ring.

Depending on the overall diameter of the cam clutch 100, the diameters of the roller 140 and the auxiliary member 150, and the depths of the engaging stepped portion 131 of the cam 130, the engaging portion 143 of the roller 140, and the engaging portion 153 of the auxiliary member 150, the spring 160 may also bias the roller 140 and the auxiliary member 150 in the radial direction.

In the present embodiment, as shown in FIGS. 1 and 2, the rollers 140 and the auxiliary members 150 are arranged between two adjacent cams 130 and are alternately arranged in the sequence of roller 140—cam 130—auxiliary member 150—cam 130—auxiliary member 150—cam 130—roller 140, and so on.

By arranging the auxiliary member 150, the number of cams 130 and rollers 140 to be arranged can be reduced to the minimum necessary to meet the required performance.

Here, the number and arrangement of the cams 130, rollers 140, and auxiliary members 150 are not particularly limited, as long as the arrangement includes multiple cams 130 and at least one auxiliary member 150.

Now, the rolling operation of the cam 130 and the auxiliary member 150 in the cam clutch 100 according to the first embodiment of the present invention will be described with reference to FIG. 7.

First, in the cam clutch 100, when the inner ring or the outer ring rotates and the cam 130 oscillates in the direction indicated by the black arrow in FIG. 7, the cylindrical portion 152 of the auxiliary member 150 can come into contact with the cam 130, and therefore even when the cams 130 on both sides adjacent to the auxiliary member 150 are pressed in a direction to approach each other, the auxiliary member 150 rolls in the direction opposite to the oscillation of the cam 130, as indicated by the black arrow in FIG. 7, in response to the oscillation of the cam 130.

Conversely, when the cams 130 oscillate in the direction indicated by the white arrows on the cams in FIG. 7, the auxiliary member 150 rolls in the direction indicated by the white arrow on the auxiliary member in FIG. 7, in response to the oscillation of the cam 130.

Accordingly, when the cam 130 operates, the auxiliary member 150 itself rolls, thereby reducing the sliding resistance of the cam 130, improving engagement performance, and stabilizing the transmitted torque.

Now, a cam clutch 200 according to a second embodiment of the present invention will be described with reference to the drawings.

In the description of the embodiment, since the configuration is the same as that of the first embodiment except for some components, the description of the components other than the differences will not be provided, and the reference numerals in the 100s used in the description and drawings of the first embodiment are replaced with those in the 200s.

Figure 8:
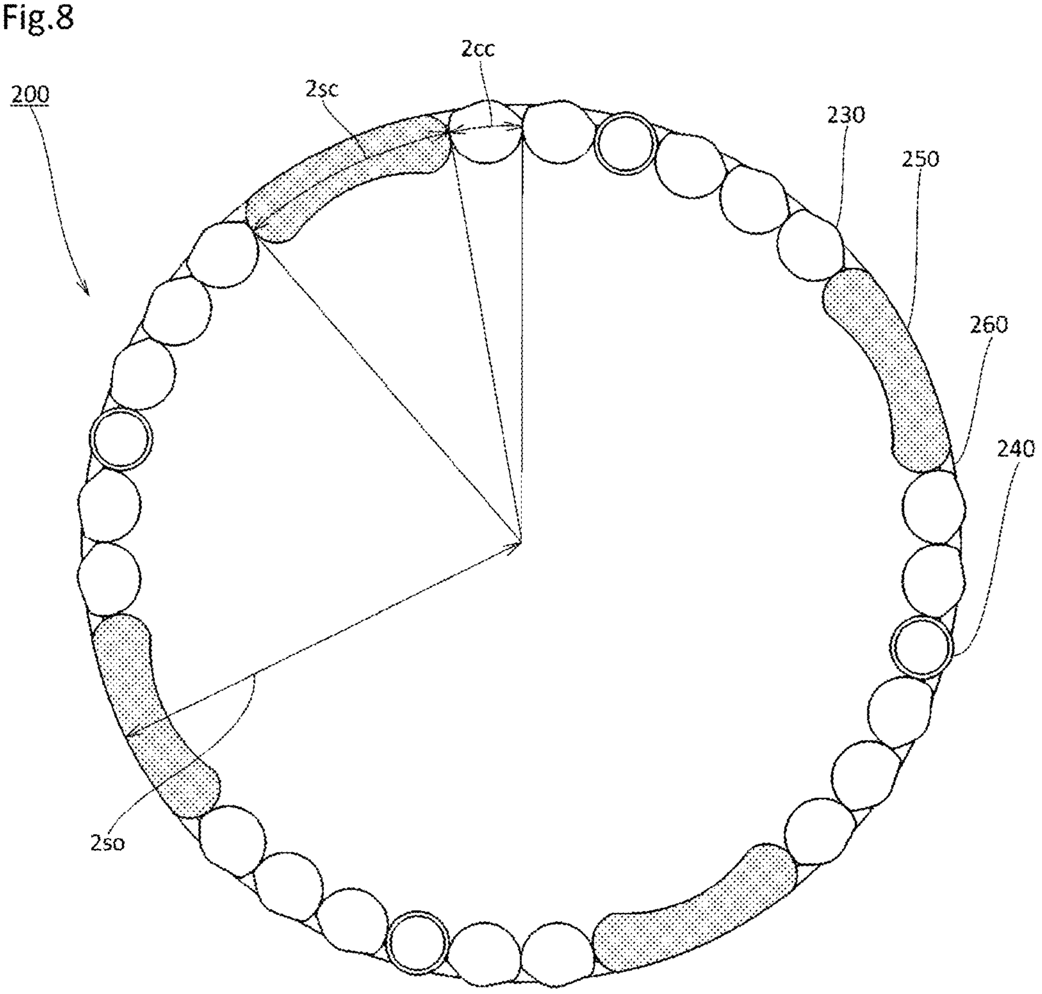
FIG. 8 is a front view of a cam clutch according to a second embodiment of the present invention as seen in the axial direction.
Figure 9:
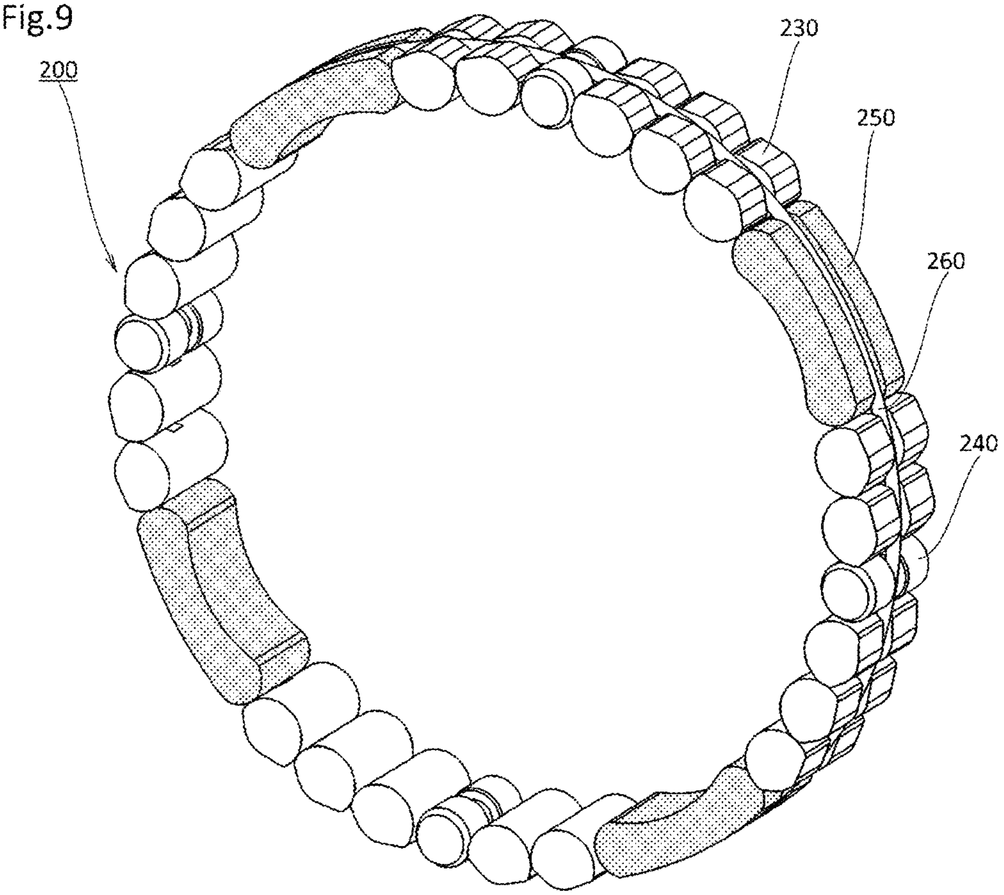
FIG. 9 is a perspective view of the cam clutch of FIG. 8 as seen from above.
Figure 10:
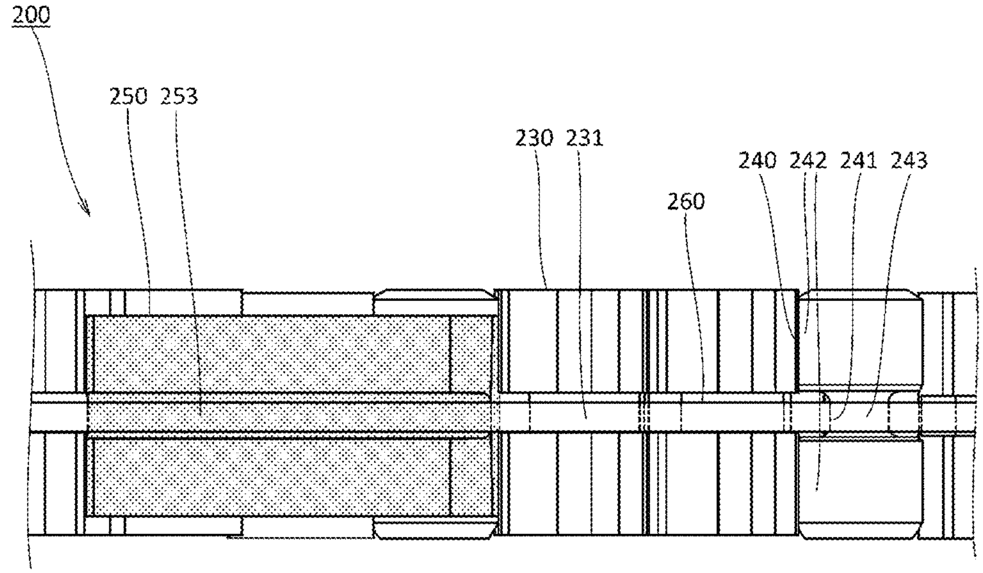
FIG. 10 is an enlarged top view of the cam clutch of FIG. 8.
Figure 11:
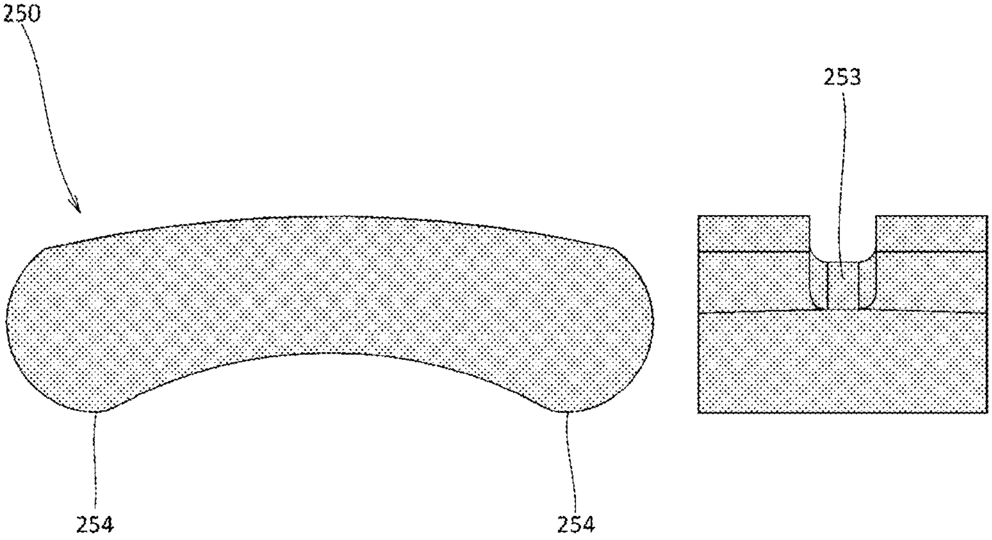
FIG. 11 includes a front view and a side view of the auxiliary member of the cam clutch of FIG. 8.

Note that in FIGS. 8 to 10, the inner ring and the outer ring are not shown.

As shown in FIGS. 8 to 11, the auxiliary member 250 of the cam clutch 200 is configured to have a bridge shape when viewed in the axial direction and includes an engaging portion 253 at the center in the axial direction, which is engageable with an annular spring 260, and a depending portion 254 at each circumferential end.

The depending portion 254 is formed to extend radially inward toward the inner ring and is configured such that, when viewed in the axial direction, the lower end of the depending portion 254 comes into contact with the outer circumferential surface of the inner ring. This reduces the contact area between the auxiliary member 250 and the outer circumferential surface of the inner ring, thereby enabling a reduction in sliding resistance between them when the auxiliary member 250 has an increased size.

As shown in FIG. 8, the circumferential dimension 2*sc* of the auxiliary member 250 is set to be equal to or greater than the circumferential dimension 2*cc* of the cam 230. As a result, the number of cams to be arranged can be optimized regardless of the diameter of the outer circumferential surface of the inner ring or the dimension of the cams, thereby reducing the number of parts and increasing design flexibility.

The outer circumferential surface of the auxiliary member 250, when the depending portions 254 at the circumferential ends are in contact with the outer circumferential surface of the inner ring, is configured so as not to contact the inner circumferential surface of the outer ring (In this embodiment, the outer circumferential surface of the auxiliary member 250 is formed in an arc shape, with a radius 2*so* that is equal to or less than the radius of the inner circumferential surface of the outer ring.). Furthermore, since the annular spring 260 constantly biases the auxiliary member 250 toward the inner ring, the opportunity for contact with the inner circumferential surface of the outer ring is reduced, thereby lowering the contact resistance when the auxiliary member 250 has an increased size.

In the present embodiment, as shown in FIG. 8, the roller 240 and the auxiliary member 250 are each arranged between two cams 230. Two cams 230 are arranged consecutively on one circumferential side of the roller 240, and three cams 230 are arranged consecutively on the other circumferential side. Each of the cams 230 at the ends of these consecutively arranged groups is positioned adjacent to the auxiliary member 250.

Now, a cam clutch 300 according to a third embodiment of the present invention will be described with reference to the drawings.

In this embodiment, since the configuration is the same as that of the second embodiment except for some components, the description of the components other than the differences will not be provided, and the reference numerals in the 200s used in the description and drawings of the second embodiment are replaced with those in the 300s.

In FIGS. 12 to 14 and 16, the inner ring and the outer ring are not shown.

Figure 16:
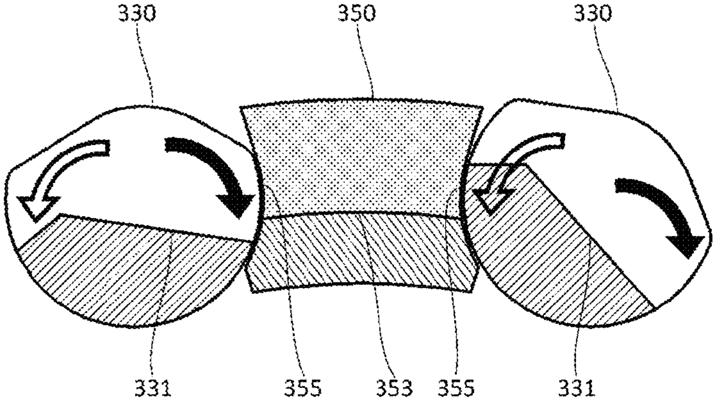
FIG. 16 is a cross-sectional view of the cam and the auxiliary member taken along line B-B in FIG. 14 illustrating the operation of these components.

FIG. 16 illustrates only an auxiliary member 350 and cams 330 adjacent thereto.

As shown in FIGS. 12 to 15, the auxiliary member 350 of the cam clutch 300 includes an engaging portion 353 at the axial center, which is engageable with an annular spring 360, and holding recesses 355 at both circumferential ends, which rotatably hold the cams 330.

The holding recesses 355 are formed toward the circumferential center of the auxiliary member 350 and are configured to rotatably hold a cam 330.

In the cam clutch 300, as shown in FIG. 16, when the inner ring or outer ring rotates and the cams 330 oscillate in the direction indicated by the black arrows in FIG. 16, the holding recesses 355 of the auxiliary member 350 rotatably hold the cams 330 adjacent to the auxiliary member 350 without hindering the operation of the cams 330.

Conversely, when the cams 330 oscillate in the direction indicated by the white arrows in FIG. 16, the holding recesses 355 of the auxiliary member 350 rotatably hold the cams 330 adjacent to the auxiliary member 350 without hindering the operation of the cams 330.

The radial position of the cam 330 is restricted by the inner ring and the outer ring, and the engagement of the circumferential side surfaces of the cams 330 with the holding recesses 355 of the auxiliary member 350 prevents radial movement of the auxiliary member 350, thereby enabling a reduction in sliding resistance between the auxiliary member 350 and the outer ring or the inner ring.

Figure 12:
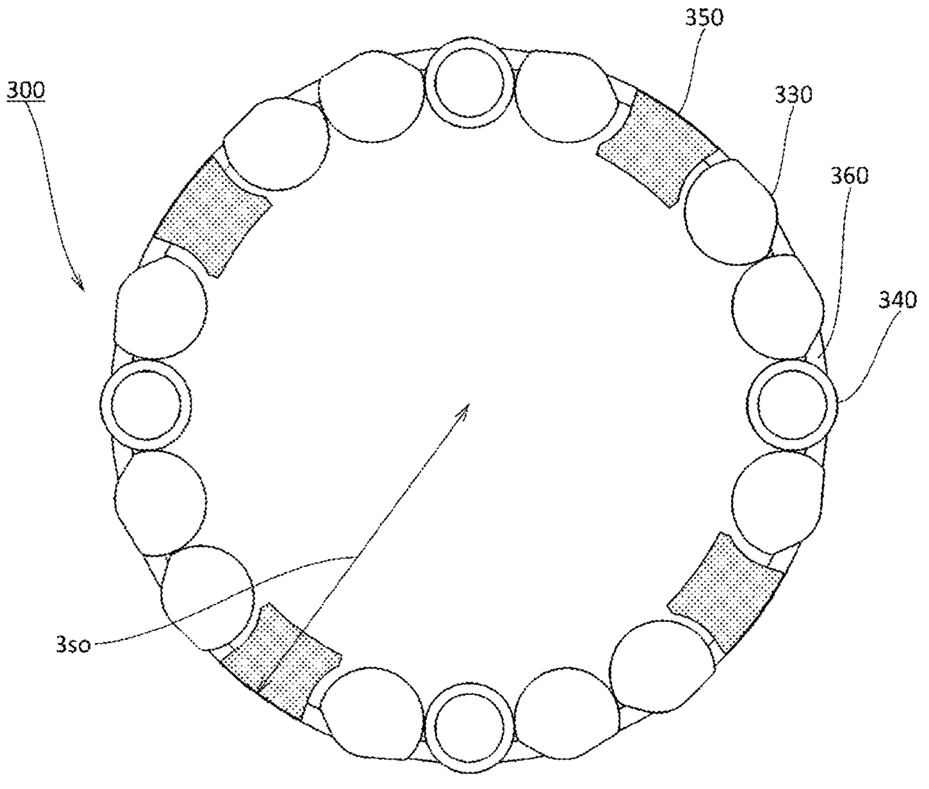
FIG. 12 is a front view of a cam clutch according to a third embodiment of the present invention as seen in the axial direction.
Figure 13:
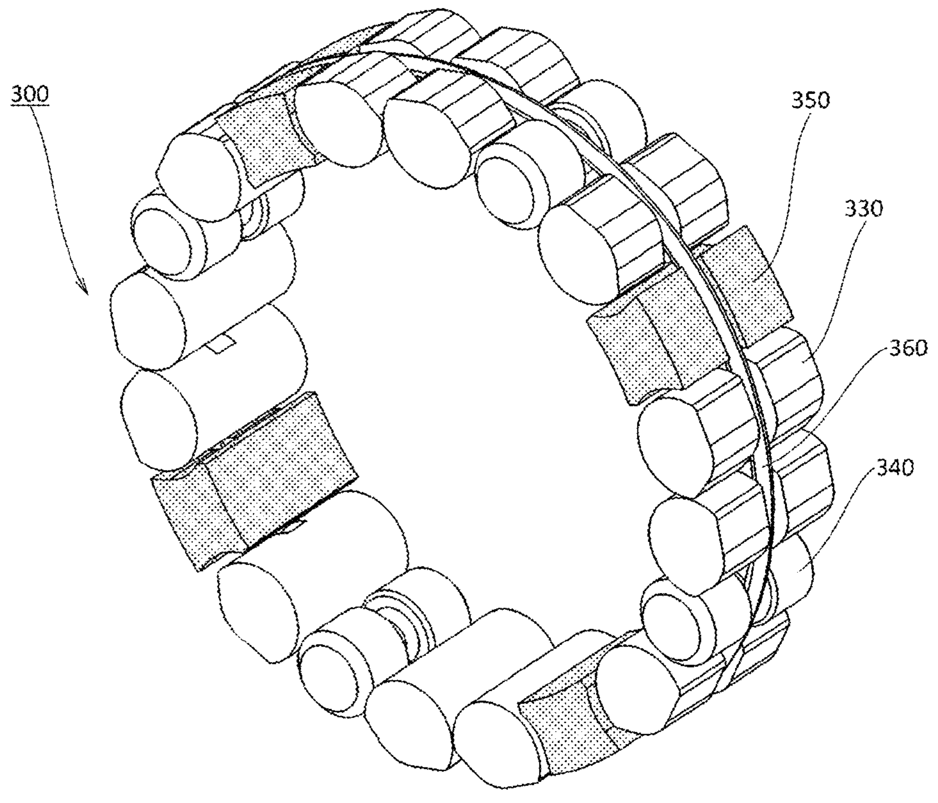
FIG. 13 is a perspective view of the cam clutch of FIG. 12 as seen from above.
Figure 14:
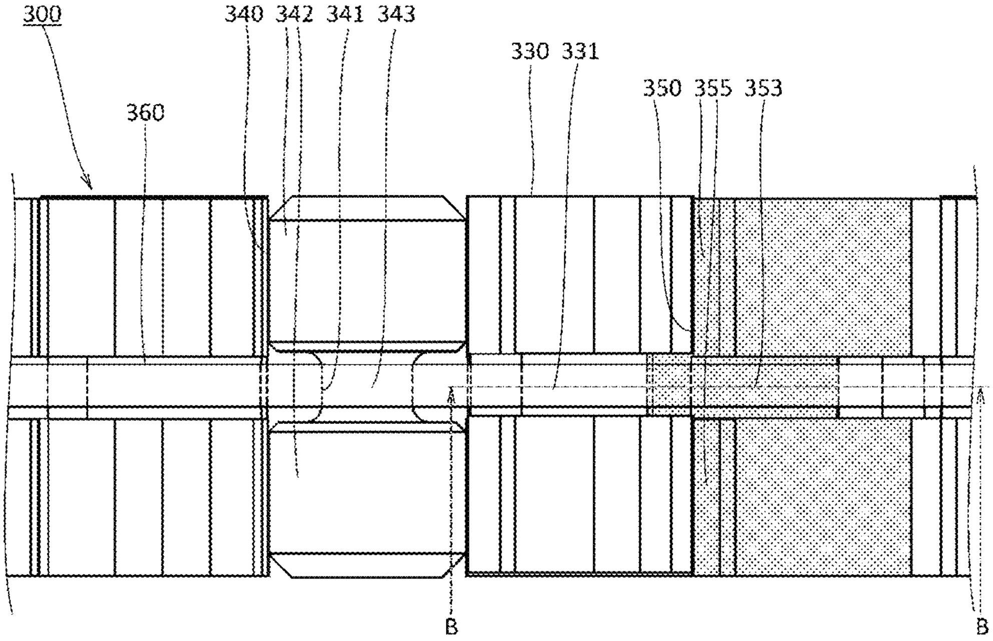
FIG. 14 is an enlarged top view of the cam clutch of FIG. 12.
Figure 15:
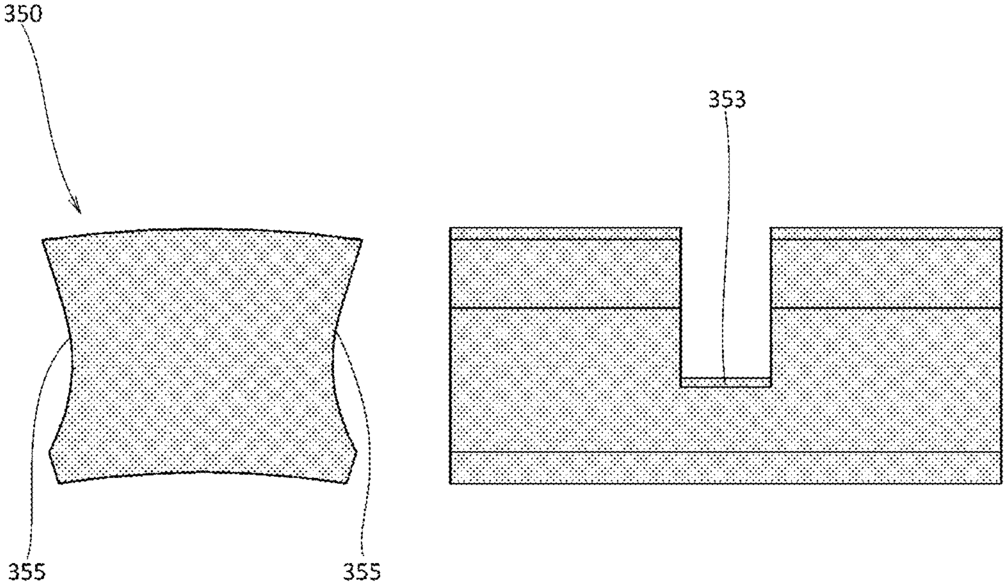
FIG. 15 includes a front view and a side view of the auxiliary member of the cam clutch of FIG. 12.

As shown in FIG. 12, in the present embodiment, the roller 340 and the auxiliary member 350 are arranged between two cams 330, one cam 330 is arranged on one circumferential side of the roller 340, and two cams 330 are arranged consecutively on the other circumferential side, and the cams 330 arranged on respective sides are positioned adjacent to the auxiliary member 350.

Now, a cam clutch 400 according to a fourth embodiment of the present invention will be described with reference to the drawings.

In this embodiment, since the configuration is the same as that of the third embodiment except for some components, the description of the components other than the differences will not be provided, and the reference numerals in the 300s used in the description and drawings of the third embodiment are replaced with those in the 400s.

Figure 17:
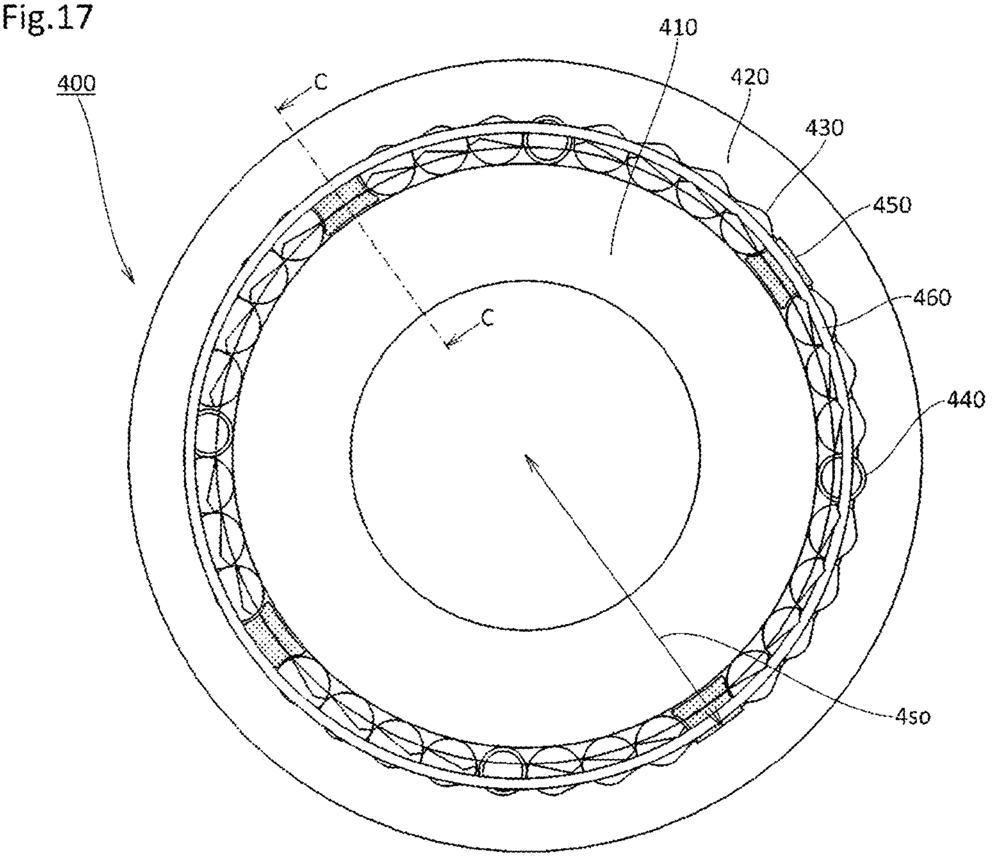
FIG. 17 is a front view of a cam clutch according to a fourth embodiment of the present invention as seen in the axial direction.
Figure 18:
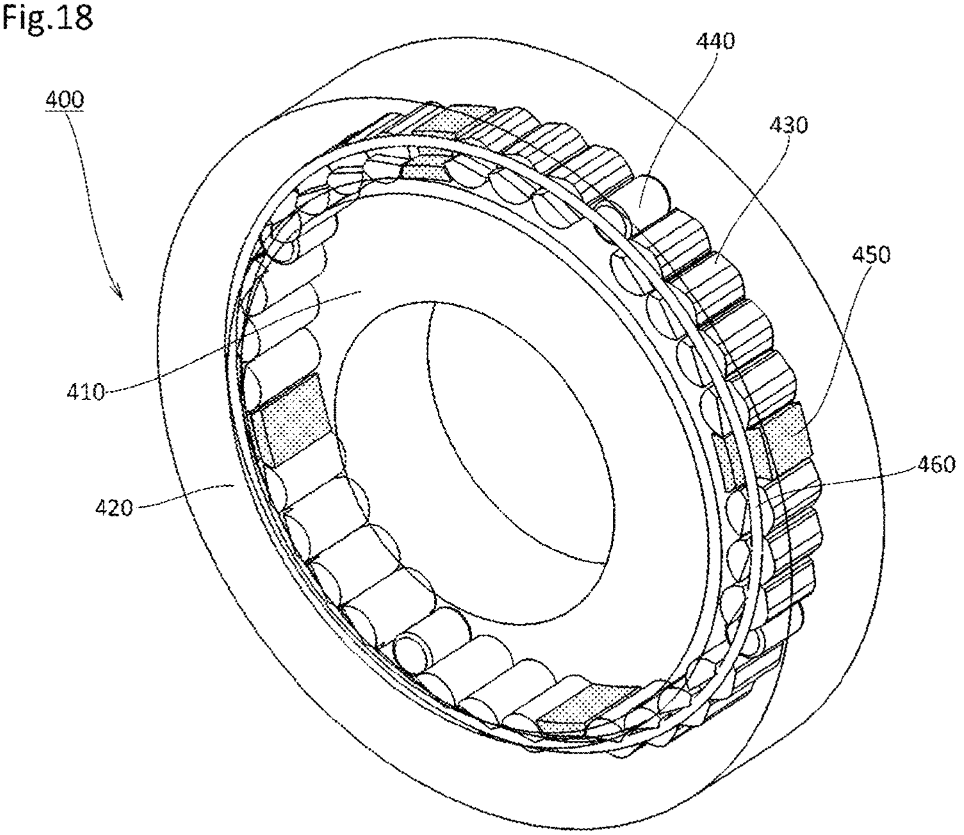
FIG. 18 is a perspective view of the cam clutch of FIG. 17 as seen from above.

FIGS. 17 and 18 illustrate only the contour line of an outer ring 420.

Figure 19:
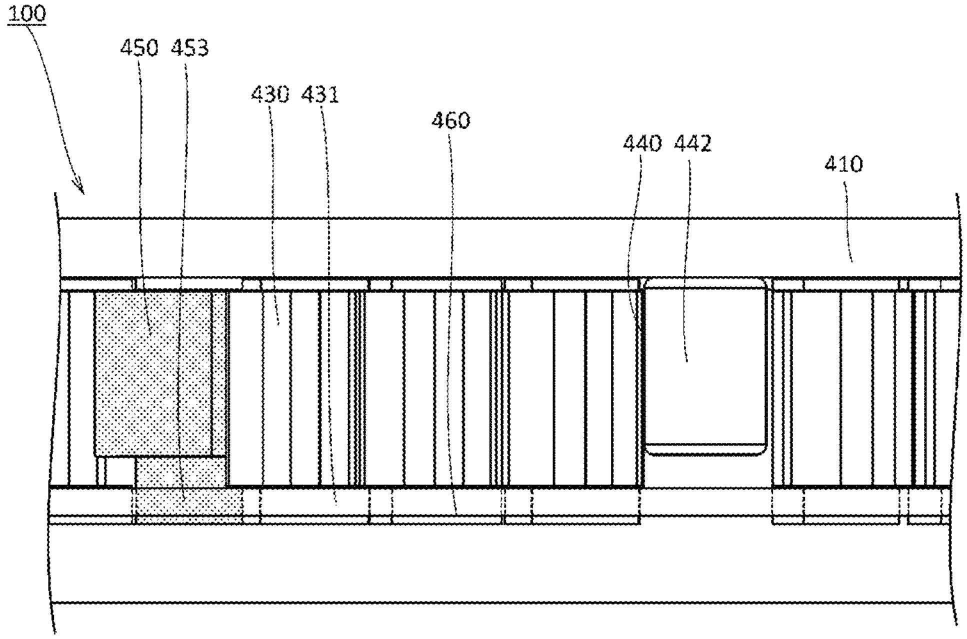
FIG. 19 is an enlarged top view of the cam clutch of FIG. 17.

In FIG. 19, the outer ring 420 is not shown.

As shown in FIGS. 17 to 20, the cam clutch 400 according to the fourth embodiment of the present invention includes a plurality of cams 430, which serve as engaging members configured to transmit and interrupt torque between an inner ring 410 and an outer ring 420 that are provided rotatably relative to each other on a common central axis in an annular space between a raceway surface of the inner ring 410 and a raceway surface of the outer ring 420, a plurality of rollers 440 arranged between the cams 430 to allow free rotation of the inner ring 410 and the outer ring 420, a plurality of auxiliary members 450 arranged between the cams 430, and an annular spring 460 which serves as biasing means.

The annular spring 460 biases the plurality of cams 430 in the radial direction and causes them to oscillate in the direction of engagement with the inner ring 410 and the outer ring 420.

Figure 21:
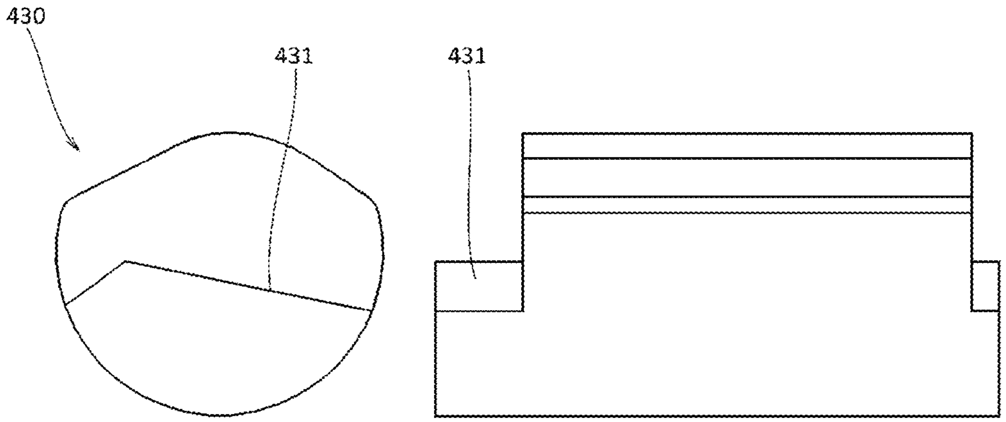
FIG. 21 includes a front view and a side view of the cam of the cam clutch of FIG. 17.

As shown in FIG. 21 and other figures, the cam 430 has an engaging stepped portion 431, which is engageable with the annular spring 460, at one axial end.

The engaging stepped portion 431 has an inclined shape that forms a protrusion at an eccentric position, and the cam 430 is biased toward the inner ring 410 in the radial direction as the spring 460 presses the protrusion at the bottom of the engaging stepped portion 431, such that the cam 430 oscillates in a direction in which the cam 430 comes into contact with the inner and outer rings.

Figure 22:
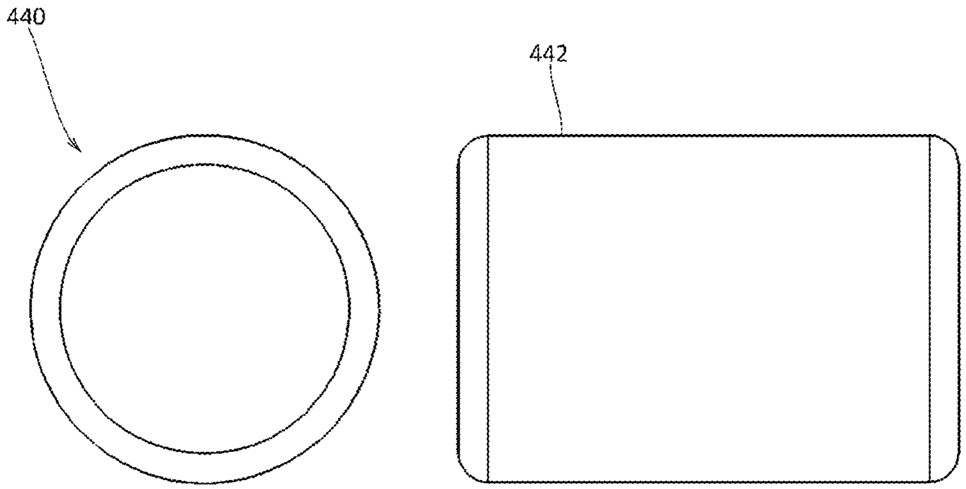
FIG. 22 includes a front view and a side view of the roller of the cam clutch of FIG. 17.

As shown in FIG. 22, the roller 440 is configured to have a cylindrical shape and has a cylindrical portion 442 having an axial dimension substantially equal to the axial dimension of the cam 430 excluding the engaging stepped portion 431.

Figure 20:
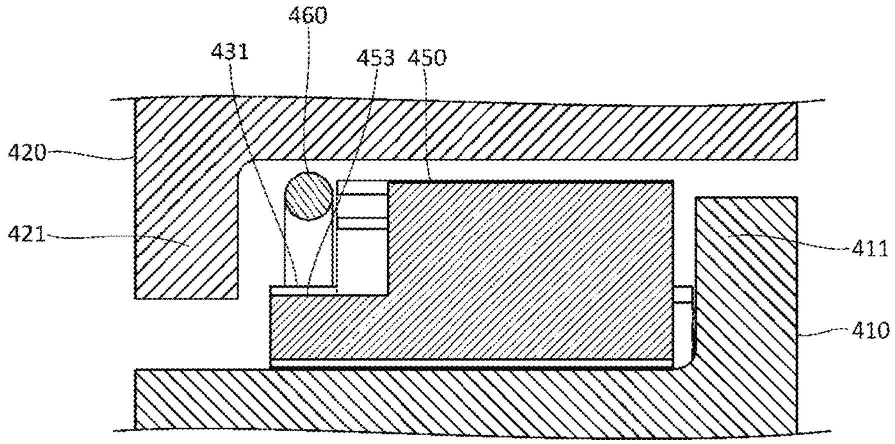
FIG. 20 is a cross-sectional view taken along line C-C in FIG. 17.

As shown in FIG. 20 and other figures, the inner ring 410 includes a flange portion 411 on the side opposite to the engaging stepped portion 431 of the cam 430 in the axial direction, so as to restrict movement of the cam 430, the roller 440, and the auxiliary member 450 toward one side in the axial direction (hereinafter referred to as the "rightward").

As shown in FIG. 20 and other figures, the outer ring 420 includes a flange portion 421 on the same side as the engaging stepped portion 431 of the cam 430, so as to restrict movement of the cam 430, the auxiliary member 450, and the spring 460 toward the other side in the axial direction (hereinafter referred to as the "leftward").

Figure 23:
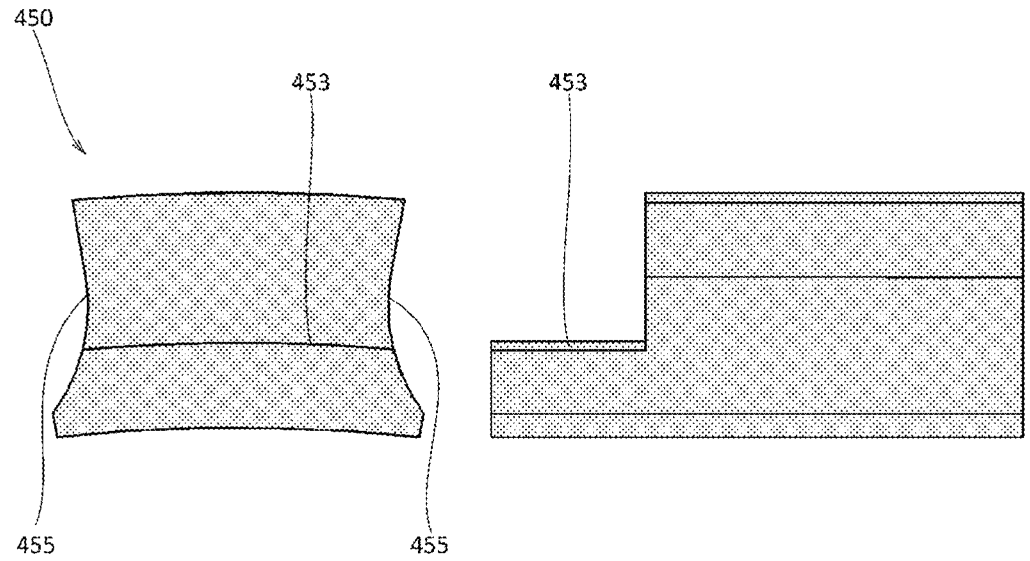
FIG. 23 includes a front view and a side view of the auxiliary member of the cam clutch of FIG. 17.

As shown in FIG. 23, the auxiliary member 450 has an engaging portion 453 at the leftward end thereof, which is engageable with the annular spring 460, and a holding recess 455 at each end thereof in the circumferential direction, which rotatably holds the cam 430.

The holding recess 455 is formed toward a central side in the circumferential direction and is configured to rotatably hold the cam 430.

The spring 460 may be a garter spring looped around the engaging stepped portion 431 of the cam 430 and the engaging portion 453 of the auxiliary member 450 to restrict leftward movement of the roller 440.

As shown in FIG. 17, in this embodiment, the roller 440 and the auxiliary member 450 are each arranged between two cams 430, with three cams 430 consecutively arranged on one circumferential side of the roller 440 and four cams 430 consecutively arranged on the other circumferential side, and each of the cams 430 at the ends of these consecutively arranged groups is arranged adjacent to the auxiliary member 450.

As shown in FIGS. 19 and 20, the engaging stepped portion 431 of the cam 430 and the engaging portion 453 of the auxiliary member 450 are arranged in the direction of the flange portion 421 of the outer ring 420. Between the cams 430, the roller 440 is arranged between the flange portion 411 of the inner ring 410 and the spring 460.

This allows the auxiliary member 450 to be arranged when the spring 460 is arranged at the end.

While the embodiments of the present invention have been described in detail, the present invention is not limited to the above embodiments, and various design changes can be made without departing from the invention recited in the claims.

In the above embodiments, the circumferential ends of the auxiliary member 250 have a protruding shape, but a holding recess for rotatably holding the cam 230 may be formed, similarly to the auxiliary member 350.

Also, similarly to the auxiliary member 250, the auxiliary members 350 and 450 may be formed to have circumferential dimensions equal to or greater than those of the cams 230 and 330.

Also, similarly to the auxiliary member 250, the auxiliary members 350 and 450 may have a depending portion formed at each circumferential end.

What is claimed is:

1. A cam clutch comprising: a plurality of cams arranged between an inner ring and an outer ring provided coaxially and rotatably relative to each other; at least one roller positioned between the plurality of cams; at least one auxiliary member arranged between the plurality of cams; and biasing means configured to bias the plurality of cams in a radial direction, the auxiliary member having an engaging portion that is engageable with the biasing means and a radial dimension that is equal to or less than a dimension between the inner ring and the outer ring, wherein at least one of the auxiliary members has a cylindrical portion that can come into contact with an adjacent one of the cams, the at least one roller includes a cylindrical portion having a diameter capable of contacting both the inner ring and the outer ring simultaneously, and a diameter of the cylindrical portion of the at least one auxiliary member is smaller than the diameter of the cylindrical portion of the at least one roller.

2. A cam clutch comprising: a plurality of cams arranged between an inner ring and an outer ring provided coaxially and rotatably relative to each other; at least one auxiliary member arranged between the plurality of cams; and biasing means configured to bias the plurality of cams in a radial direction, the auxiliary member having an engaging portion that is engageable with the biasing means and a radial dimension that is equal to or less than a dimension between the inner ring and the outer ring, wherein at least one of the auxiliary members has a circumferential dimension that is equal to or greater than that of the cam, and wherein the at least one of the auxiliary members has an outward protruding curve portion that can come into contact with an adjacent one of the cams.

3. A cam clutch comprising: a plurality of cams arranged between an inner ring and an outer ring provided coaxially and rotatably relative to each other; at least one auxiliary member arranged between the plurality of cams; and biasing means configured to bias the plurality of cams in a radial direction, the auxiliary member having an engaging portion that is engageable with the biasing means and a radial dimension that is equal to or less than a dimension between the inner ring and the outer ring, wherein at least one of the auxiliary members has a depending portion at each circumferential end thereof, and the depending portion is formed to extend toward the inner ring and has a lower end in contact with an outer circumferential surface of the inner ring as seen in an axial direction.

4. A cam clutch comprising: a plurality of cams arranged between an inner ring and an outer ring provided coaxially and rotatably relative to each other; at least one auxiliary member arranged between the plurality of cams; and biasing means configured to bias the plurality of cams in a radial direction, the auxiliary member having an engaging portion that is engageable with the biasing means and a radial dimension that is equal to or less than a dimension between the inner ring and the outer ring, wherein at least one of the auxiliary members includes a holding recess formed at a circumferential end thereof to rotatably hold an adjacent one of the cams.

5. The cam clutch according to claim 4, wherein the holding recess of the at least one of the auxiliary members comes into contact with the adjacent one of the cams.

6. A cam clutch comprising: a plurality of cams arranged between an inner ring and an outer ring provided coaxially and rotatably relative to each other; at least one auxiliary member arranged between the plurality of cams; and biasing means configured to bias the plurality of cams in a radial direction, the auxiliary member having an engaging portion that is engageable with the biasing means and a radial dimension that is equal to or less than a dimension between the inner ring and the outer ring, wherein the outer ring and the inner ring each have a flange portion that restricts axial movement of the cam and the auxiliary member, the engaging portion is formed at one axial end, the at least one auxiliary member includes a holding recess at each end thereof in the circumferential direction to rotatably hold a corresponding one of the cams.

* * * * *